April 7, 1925.                    1,532,220
F. P. ARROUSEZ ET AL
PLUG BOX AND PLUG
Filed May 11, 1920          3 Sheets-Sheet 1

Inventors
Frank P. Arrousez
Willis C. Hollins
by Graham + Hann
Attorneys

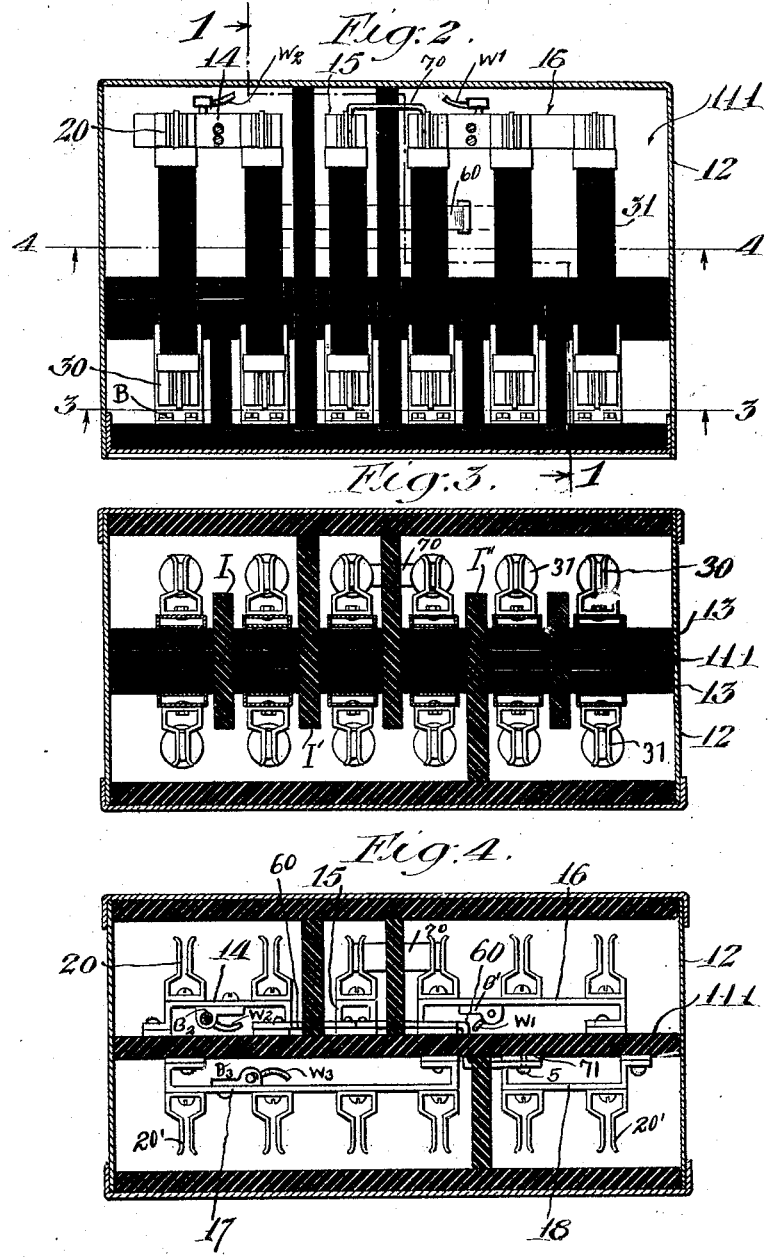

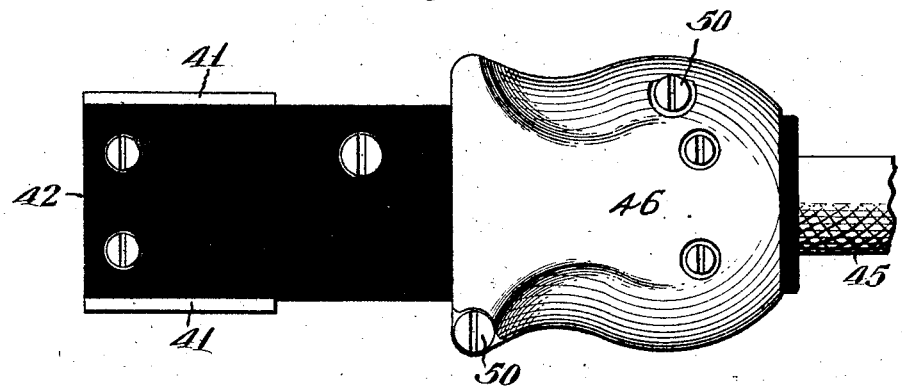
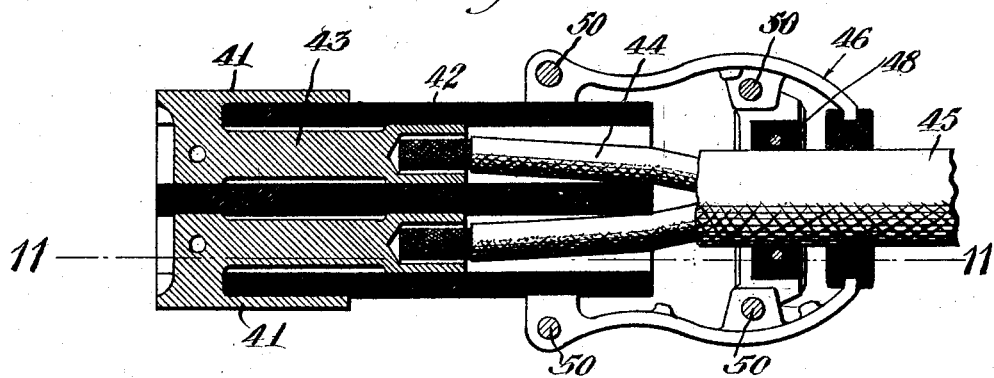
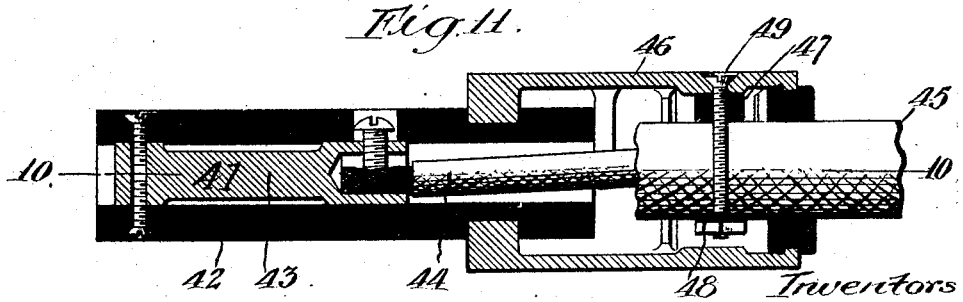

Patented Apr. 7, 1925.

1,532,220

UNITED STATES PATENT OFFICE.

FRANK P. ARROUSEZ AND WILLIS C. HOLLINS, OF LOS ANGELES, CALIFORNIA.

PLUG BOX AND PLUG.

Application filed May 11, 1920. Serial No. 380,666.

*To all whom it may concern:*

Be it known that we, FRANK P. ARROUSEZ and WILLIS C. HOLLINS, both citizens of the United States, residing at Los Angeles, in the county of Los Angeles and State of California, have invented a new and useful Plug Box and Plug, of which the following is a specification.

Our invention relates to portable plug boxes such as are used in motion picture studios and the like for readily making connections to sources of electric power.

The principal object of our invention is to provide a plug box which is so constructed that it can be used on either three phase three wire; standard, three wire; or two wire circuits.

The further object of the invention is to provide a novel form of plug for use in such boxes.

Referring to the drawings which are for illustrative purposes only,

Fig. 2 is a section on a plane represented by the line 2—2 of Fig. 1.

Fig. 3 is a section on a plane represented by the line 3—3 of Fig. 2.

Fig. 4 is a section on a plane represented by the line 4—4 of Fig. 2, but with fuses omitted.

Fig. 9 is a side elevation of a preferred form of plug.

Fig. 10 is a central section therethrough substantially on the line 10—10 of Fig. 11.

Fig. 11 is a section on a plane represented by the line 11—11 of Fig. 10.

Figure 5:
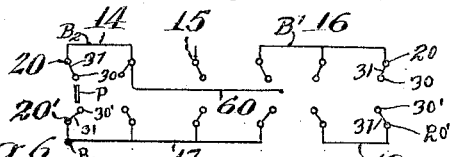
Fig. 5 is a diagram of the parts with all removable jumpers omitted.

Referring to the drawings which are for illustrative purposes only, 111 is a sheet of insulation secured in the center of a steel box 12 and shown as carrying insulating strips 13. Mounted on bus bars 14, 15, 16, 17 and 18 on the member 111 as shown in Fig. 4 are inner fuse jaws 20 and 20', these jaws being arranged in pairs shown as lying in parallel vertical planes. The bus bar 14 connects two of the upper fuse jaws 20 which are hereinafter referred to as the first two upper inner jaws. The terms "upper" and "lower" as used herein, have reference to the position assumed by these jaws in the diagrams constituting Figs. 5 to 8 inclusive of the drawing, it being understood of course that the box may be turned either side up, and that the words "upper" and "lower" are to be understood as merely words of convenience for identification of the parts and not as correctly designating the position of the parts at all times. The bus bar 15 carries a third jaw, hereinafter referred to as the third upper inner jaw. The bus bar 16 carries three jaws, hereinafter referred to as the last three upper jaws. The bus bar 17 carries four jaws 20', hereinafter referred to as the first four lower inner jaws; and the bus bar 18 carries two jaws 20', hereinafter referred to as the last two lower jaws. Secured to the insulating strips 13 are a series of outer fuse jaws 30, 30', these jaws being all alike. They are shown as entirely disconnected and as insulated from each other by plates I, I', I'' (the latter extending as a barrier between the bases of some of the inner jaws 20, 20') and from the box 12 by means of the strips 13. Enclosed fuses 31 connect each of the inner jaws 20, 20' to one of the outer jaws 30, 30'. Each of the outer jaws 30, 30' may carry a flexible metal strip 40, adapted to connect with contact members 41 carried on an insulating member 42 of any suitable plug, our preferred form of plug being shown in Figs. 9, 10 and 11.

In the plugs P, or their equivalent, each of the contacts 41 may be provided with a member 43 to which a wire 44 may be secured, the two wires 44 forming a portion of a flexible cable 45 which is shown as secured in a split metal cover 46 by means of insulation members 47 and 48, clamped together by screws 49. The plug cover 46 is preferably made in two halves, meeting on the line 10—10 of Fig. 11 and secured together by screws 50. These plugs may be inserted through openings O in an insulating front plate F, to which fuse jaws 30, 30' are shown as secured by bolts B; the general effect of the insertion of a plug between a pair of outer fuse jaws 30, 30' being obviously the interposition of a load between an upper jaw 20 and a corresponding lower jaw 20' otherwise insulated therefrom.

A fixed jumper member 60 is permanently connected to the bus bar 14 and passes through the member 111 into a position adjacent to the fifth of the lower jaws 20', which is on the bus bar 18, as shown in Fig. 5. Removable jumpers are provided; and they may be used interchangeably as illustrated in the diagrams. The box as shipped may be without removable jumpers and is preferably connected as shown in Fig. 5, in which the bus bars 14 to 18 inclusive are illustrated.

Figure 6:
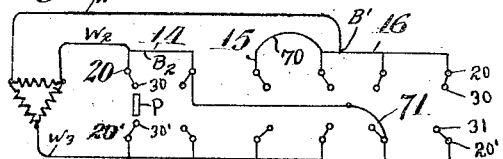
Fig. 6 is a diagram showing the arrangement when the box is used on a three phase circuit.

When it is desired to use the box for connecting into a three phase circuit, it may be arranged as shown in Fig. 6, (with which preceding figures correspond) a jumper 70 being used to connect the bus bars 15 and 16 and a jumper 71 (shown as depending from a screw S) being used to connect the fixed jumper 60 with the bus bar 18, under one end of which it is movable at will. If now a plug P similar to that shown in Figs. 9 to 11 inclusive be inserted between any pair of contacts 40, and the three wires $W^1$ $W^2$ and $W^3$ from the generator being connected respectively with bus bars 16 (or 15) and 17, said contacts and any translating device therebetween will be each connected into one phase of the three phase circuit, the first two sets 14 of contacts 40 (counting from the left of Fig. 6) receiving one phase, the second two sets receiving a second phase and the third two receiving the third phase, the wires $W^1$ $W^2$ $W^3$ being shown as connected respectively with the bus bars at $B^1$, $B^2$ and $B^3$.

Figure 7:
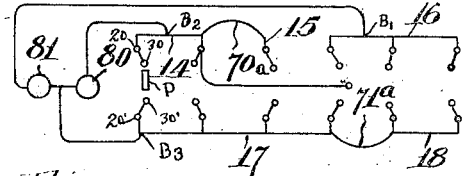
Fig. 7 is a diagram showing the arrangement when the box is used on standard three wire circuit.

If it is desired to connect in on either side of a three wire circuit as illustrated in Fig. 7, a jumper $70^a$ is used to connect the bus bars 14 and 15, and the jumper $71^a$ is used to connect the bus bars 17 and 18. With the members arranged in this manner, suitable feed being provided, the first three sets of jaws represent one side of the circuit fed, for example, by a generator or transformer 80, and the last three sets of jaws are used to connect to a generator or to a transformer 81.

Figure 8:
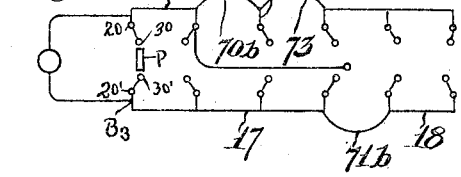
Fig. 8 is a diagram showing the connections when the box is used on two wire circuit.
Figure 1:
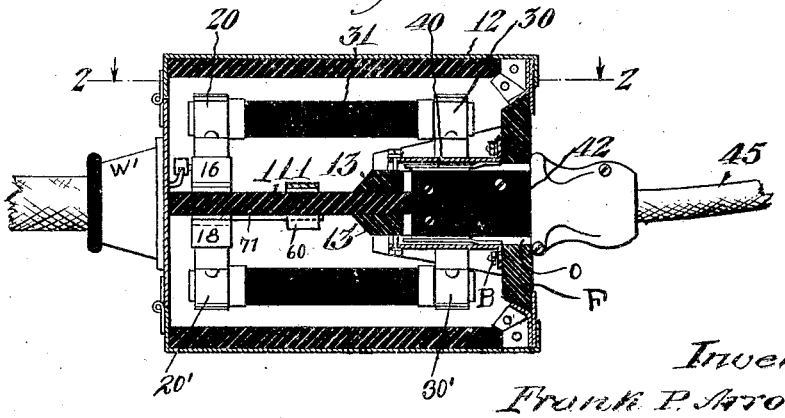
Fig. 1 is a section through such a box with our improved form of plug in place.

If it is desired to use the box on a single phase or on any other two-wire circuit, it may be arranged as in Fig. 8, in which the jumper 73 connects the bus bars 15 and 16 and the jumper $71^b$ is used to connect the bus bars 17 and 18. It will be noted that all the top jaws are connected together, all the bottom jaws are connected together, each set of jaws being connected to one side of a single phase circuit. If now a plug of the general character described is inserted in any of the openings of the box, the load fed by the cable 45 is connected into this single phase circuit.

Although we have herein described one complete embodiment of our invention, it will be understood that various features thereof might be independently employed and also that various modifications might be made, by those skilled in the art, without the slightest departure from the spirit and scope of our invention, as the same is indicated above and in the following claims.

We claim as our invention:

1. In a plug box: a series of twelve jaws arranged in six pairs, each pair comprising an upper jaw and a lower jaw; means for connecting the first two upper jaws together; means for connecting the last three upper jaws together; means for connecting the first four lower jaws together; means for connecting the last two lower jaws together; a fixed jumper comprising means permitting a connection of the first two upper jaws to the last two lower jaws, the third upper jaw and the last three upper jaws being adapted to be connected at will by a jumper; and means for connecting the three wires of a three phase circuit to the first two upper and last two lower, the last four upper, and the first four lower jaws respectively.

2. In a plug box: a series of twelve jaws arranged in six pairs, each pair comprising an upper jaw and a lower jaw; means for connecting the first two upper jaws together; means for connecting the last three upper jaws together; means for connecting the first four lower jaws together; means for connecting the last two lower jaws together, said jaws being arranged to permit the use of a jumper connecting the first two upper jaws with the third upper jaw and the use of a jumper connecting the first four lower jaws with the last two lower jaws; means permitting the connecting of the neutral of a three wire circuit to the six lower jaws; and means permitting the connecting of each of the outside wires of said circuit with one of the two sets of three upper jaws.

3. In a plug box: a series of twelve jaws arranged in six pairs, each pair comprising an upper jaw and a lower jaw; means for connecting the first two upper jaws together; means for connecting the last three upper jaws together; means for connecting the first four lower jaws together; means for connecting the last two lower jaws together, said jaws being arranged to permit the use of jumpers connecting all of the upper jaws together and the use of a jumper connecting all of the lower jaws together; and means permitting the connecting of the two wires of a two wire circuit to the top and bottom jaws respectively.

4. In a plug box: a series of twelve jaws arranged in six pairs, each pair comprising an upper jaw and a lower jaw; means for connecting the first two upper jaws together; means for connecting the last three upper jaws together; means for connecting the first four lower jaws together; means for connecting the last two lower jaws together; a fixed jumper connection extending from the first two upper jaws to the neighborhood of the last two lower jaws, said jaws being arranged to permit the use of jumpers of suitable length to connect the second to the third, or the third to the fourth upper jaw, or the fourth to the fifth lower jaw, or said fixed jumper connection to the fourth lower jaw.

5. In a plug box: a series of twelve jaws arranged in six pairs, each pair comprising an upper jaw and a lower jaw; insulation between certain of said pairs of jaws; means for connecting the first two upper jaws together; means for connecting the last three upper jaws together; means for connecting the first four lower jaws together; means for connecting the last two lower jaws together, said jaws being arranged to permit the use of a jumper for connecting the first two upper jaws to the last two lower jaws, and the use of a jumper for connecting the third upper jaw and the last three upper jaws; means permitting the connection of the three wires of a three phase circuit to the first two upper and the last two lower, the last four upper, and the first four lower jaws respectively.

6. In a plug box: a series of twelve jaws arranged in six pairs, each pair comprising an upper jaw and a lower jaw; insulation between certain of said pairs of jaws; means for connecting the first two upper jaws together; means for connecting the last three upper jaws together; means for connecting the first four lower jaws together; means for connecting the last two lower jaws together, said jaws being arranged to permit the use of a jumper for connecting the first two upper jaws with the third upper jaw and the use of a jumper connecting the first four lower jaws with the last two lower jaws; means permitting the connecting of the neutral of a three wire circuit to the six lower jaws; and means permitting the connecting of each of the outside wires of said circuit with one of the two sets of three upper jaws.

7. In a plug box: a series of twelve jaws arranged in six pairs, each pair comprising an upper jaw and a lower jaw; insulation between the bases of some of said pairs of jaws; means for connecting the first two upper jaws together; means for connecting the last three upper jaws together; means for connecting the first four lower jaws together; means for connecting the last two lower jaws together, said jaws being arranged to permit the use of jumpers connecting all of the upper jaws together and connecting all of the lower jaws together; and means permitting the connection of the two wires of a two wire circuit to the top and bottom jaws respectively.

8. In a plug box: a series of twelve jaws arranged in six pairs, each pair comprising an upper jaw and a lower jaw; barriers between the bases of some of said jaws; means for connecting the first two upper jaws together; means for connecting the last three upper jaws together; means for connecting the first four lower jaws together; means for connecting the last two lower jaws together; a permanent crossover connection extending from the first two upper jaws to the neighborhood of the last two lower jaws, said jaws being arranged to permit the use of jumpers of suitable length to connect the second to the third, or the third to the fourth upper jaw, or the fourth to the fifth lower jaw, or said crossover to the fifth lower jaw.

In testimony whereof, we have hereunto set our hands at Los Angeles, California, this 5th day of May, 1920.

FRANK P. ARROUSEZ.
WILLIS C. HOLLINS.